United States Patent
Leonard et al.

(10) Patent No.: US 10,933,799 B1
(45) Date of Patent: Mar. 2, 2021

(54) LIGHT SYSTEM FOR TRACTOR

(71) Applicants: John W. Leonard, Eldon, MO (US); April M. Leonard, Eldon, MO (US)

(72) Inventors: John W. Leonard, Eldon, MO (US); April M. Leonard, Eldon, MO (US)

(*) Notice: Subject to any disclaimer, the term of this patent is extended or adjusted under 35 U.S.C. 154(b) by 588 days.

(21) Appl. No.: 15/458,448

(22) Filed: Mar. 14, 2017

(51) Int. Cl.
*B60Q 1/18* (2006.01)
*B60Q 1/04* (2006.01)
*B60Q 1/05* (2006.01)

(52) U.S. Cl.
CPC .............. *B60Q 1/18* (2013.01); *B60Q 1/0483* (2013.01); *B60Q 1/05* (2013.01); *B60Y 2200/221* (2013.01)

(58) Field of Classification Search
CPC .......... B60Q 1/05; B60Q 1/0483; B60Q 1/18; B60Y 2200/221
USPC ........ 180/900; 362/549, 371, 418, 427, 432, 362/485
See application file for complete search history.

(56) References Cited

U.S. PATENT DOCUMENTS

| | | | | |
|---|---|---|---|---|
| 1,394,694 A | * | 10/1921 | Sylvester | B60Q 1/0483 362/413 |
| 3,783,267 A | * | 1/1974 | Thomas | B60P 3/18 340/472 |
| 3,934,134 A | * | 1/1976 | Wassel | B60Q 1/0035 362/549 |
| 4,023,030 A | | 5/1977 | Teti | |
| 4,234,908 A | | 11/1980 | McGee | |
| 4,286,309 A | * | 8/1981 | Rasinski | B60Q 1/305 280/414.1 |
| 4,363,084 A | * | 12/1982 | Dimiceli | B60Q 7/00 362/249.01 |
| 4,449,172 A | | 5/1984 | Warshawsky | |
| 4,470,106 A | | 9/1984 | Norton | |
| 4,779,168 A | | 10/1988 | Montgomery | |
| 4,894,755 A | | 1/1990 | Chandler | |
| 5,027,200 A | | 6/1991 | Petrossian et al. | |
| 5,203,621 A | | 4/1993 | Weinmeister et al. | |
| 5,572,837 A | * | 11/1996 | Featherstone | B60P 3/18 52/118 |
| 6,062,713 A | * | 5/2000 | Renlger | B60Q 1/26 362/477 |
| 6,484,456 B1 | * | 11/2002 | Featherstone | H01Q 1/08 362/249.09 |
| 6,918,689 B2 | * | 7/2005 | Schmidt | B60Q 1/0483 362/402 |

(Continued)

FOREIGN PATENT DOCUMENTS

EP      1114748 A2     7/2001

OTHER PUBLICATIONS

Five Photos of Lights on Tractor, Admitted Prior Art, 1 Page.

*Primary Examiner* — Julie A Bannan
(74) *Attorney, Agent, or Firm* — Stinson LLP (57) ABSTRACT

An auxiliary light system for a tractor for illuminating an area in front of a loader of the tractor. The auxiliary light system can include a pair of light assemblies mounted on respective loader brackets connecting the loader to a main body of the tractor. The light assemblies can be controlled from an operator station of the tractor to move lights on the light assemblies between stowed and operational positions. The light assemblies can be installed as original equipment on the tractor or applied to the tractor as after-market equipment. Associated methods are also disclosed.

19 Claims, 11 Drawing Sheets

(56) References Cited

U.S. PATENT DOCUMENTS

2005/0185412 A1* 8/2005 Hutchinson .............. B60Q 1/18
362/485
2005/0270778 A1* 12/2005 Hicok ...................... B60Q 1/24
362/253

* cited by examiner

LIGHT SYSTEM FOR TRACTOR

FIELD

The present disclosure generally relates to light systems, and more particularly to light systems for tractors or other vehicles and associated methods.

BACKGROUND

Tractors are commonly used for accomplishing tasks at farms, ranches, orchards, homes, warehouses, construction sites, and other locations. Many times tractors are used indoors, at night, or in other conditions where additional illumination is desired. Common tractors have standard headlamps to provide illumination in front of the tractor. However, light from the headlamps can be blocked by a loader on a front of the tractor.

SUMMARY

In one aspect, a tractor includes a main body and a loader supported by the main body. At least one loader bracket connects the loader to the main body. The tractor includes a light system including at least one light assembly secured to the loader bracket. The light assembly includes an arm and at least one light. The arm has a proximal section connected to the loader bracket and a distal section supported by the proximal section. The light is secured to the distal section. The distal section has retracted and extended positions with respect to the proximal section. The distal section is movable with respect to the proximal section for moving the distal section between the retracted and extended positions. The distal section in the extended position extends farther away from the proximal section than when the distal section is in the retracted position.

In another aspect, a tractor includes a main body and a loader supported by the main body. At least one loader bracket connects the loader to the main body. The tractor includes a light system including at least one light assembly secured to the loader bracket. The light assembly includes an arm and at least one light on the arm. The at least one light includes a directional light. The directional light is movably mounted on the arm to permit movement of the directional light to selected orientations for directing light produced by the directional light in a desired direction.

In another aspect, a tractor includes a main body and a loader supported by the main body. The tractor includes at least one loader bracket connecting the loader to the main body. The tractor includes a light system including at least one light assembly secured to the loader bracket. The light assembly includes a mount, an arm, and at least one light. The mount secures the light assembly to the loader bracket. The arm is supported by the mount. The light is secured to the arm. The light assembly is configurable in a stowed configuration and in an operational configuration different than the stowed configuration. The arm extends farther away from the main body in the operational configuration than in the stowed configuration. The light in the operational configuration is at least partially laterally outboard of a most laterally outboard side of the loader for illuminating an area in front of the loader.

In yet another aspect, a light system for a tractor is configured for being mounted on a tractor or other vehicle. The light system comprises at least one light assembly that includes at least one light.

Other objects and features of the present invention will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
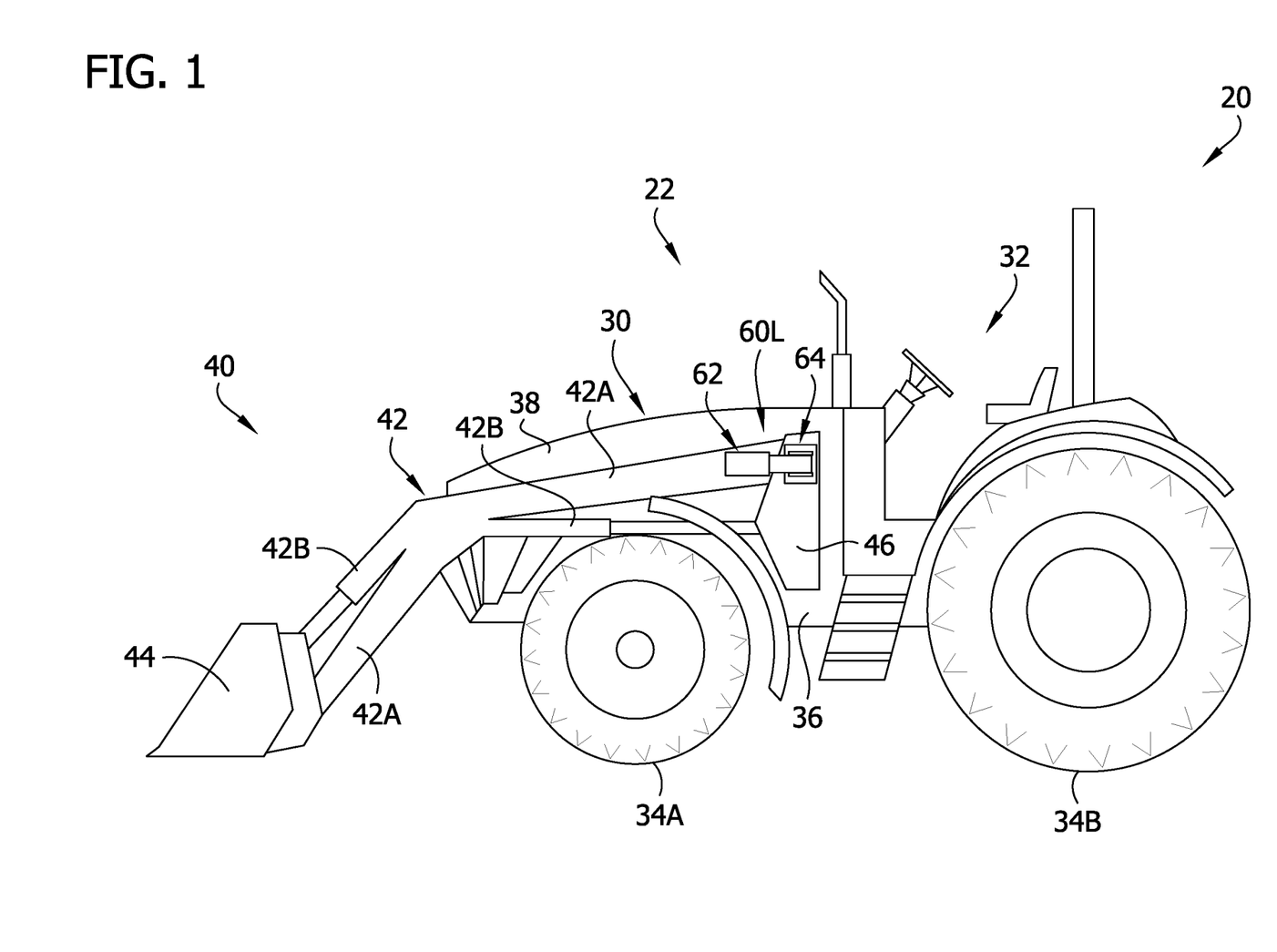
FIG. 1 is a side elevation of a tractor of the present disclosure having an auxiliary light system.
Figure 2:
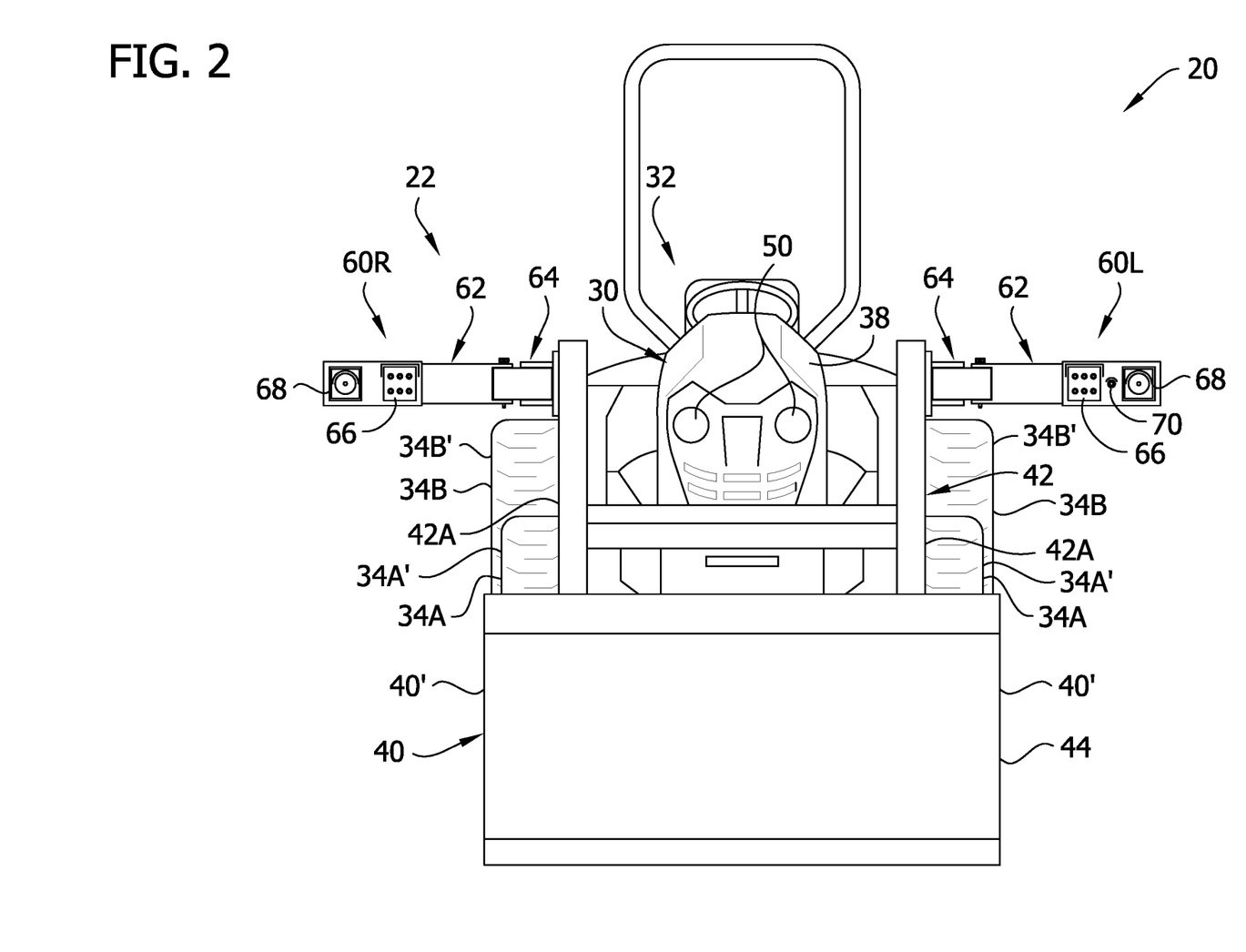
FIG. 2 is a front elevation of the tractor of FIG. 1, light assemblies of the auxiliary light system being shown in extended, operational configurations.

Referring to FIGS. 1 and 2, a tractor of the present disclosure is indicated generally by the reference number 20. The tractor may be referred to as a utility tractor or by other names, and can be used for various tasks at farms, ranches, orchards, homes, warehouses, construction sites, or other locations. As will be explained in further detail below, the tractor 20 includes an auxiliary light system 22 for illuminating an area in front of the tractor and/or to the sides of the tractor.

As shown in FIG. 1, the tractor has a main body 30, an operator station 32, and forward and rear wheels 34A, 34B. The main body 30 includes a frame 36 to which the wheels 34A, 34B are connected by axles (not shown). A hood 38 of the main body 30 covers an engine (not shown) supported by the frame 36. The tractor 20 also includes a loader generally indicated by 40. The loader 40 includes a boom 42 and a front implement 44. In the illustrated embodiment, the implement 44 is a bucket, but it will be understood that the implement can be a bale spear, a grapple, pallet forks, or another type of implement. The boom 42 includes boom arms 42A and hydraulic pistons 42B for moving the boom arms and implement 44. The boom 42 is connected to the main body 30 of the tractor by a loader bracket 46. For example, the loader bracket 46 can be fixed to the frame 36. Alternatively, the loader bracket 46 can be removably mounted and be removable with the boom 42 of the loader 40. In use, the loader bracket 46 remains stationary with respect to the main body 30 while the boom arms 42A and hydraulic pistons 42B move. As will be understood, a user can sit at the operator's station 32 and operate the tractor 20 to execute various tasks with the tractor, some of which may involve use of the loader 40.

As shown in FIG. 2, the tractor 20 includes a pair of headlights 50 at a front end of the main body 30. The headlights 50 are oriented for illuminating an area in front of the tractor 20. However, the loader 40 extends in front of the headlights 50 and can block light from the headlights, thus preventing the headlights from sufficiently illuminating the area in front of the tractor. Serious safety hazards can arise if a person is operating the tractor without sufficient illumination. For example, an operator using the tractor 20 at night to move hay bales from a field to a hay loft in a barn can encounter several safety risks. When a hay bale is lifted by the loader 40 (e.g., using a bale spear instead of the bucket 44) in front of the tractor 20 to take the bale from the field, the loader and/or the bale can block light from the headlights. If the operator cannot see the travel path ahead of the tractor 20, they are at risk of encountering an unseen obstacle in front of the tractor, such as other hay bales or uneven terrain, which could cause the tractor to overturn. Moreover, the operator may not be able to see well in the barn because the bale blocks the headlights or the headlights otherwise do not sufficiently illuminate the hay loft. Lifting and placing heavy bales overhead in a loft without sufficient illumination can present various safety hazards. It will be understood that many other circumstances in which the tractor 20 may be used also present safety hazards without sufficient illumination due to blockage of the headlights by the loader and/or an item carried by the loader.

Figure 3:
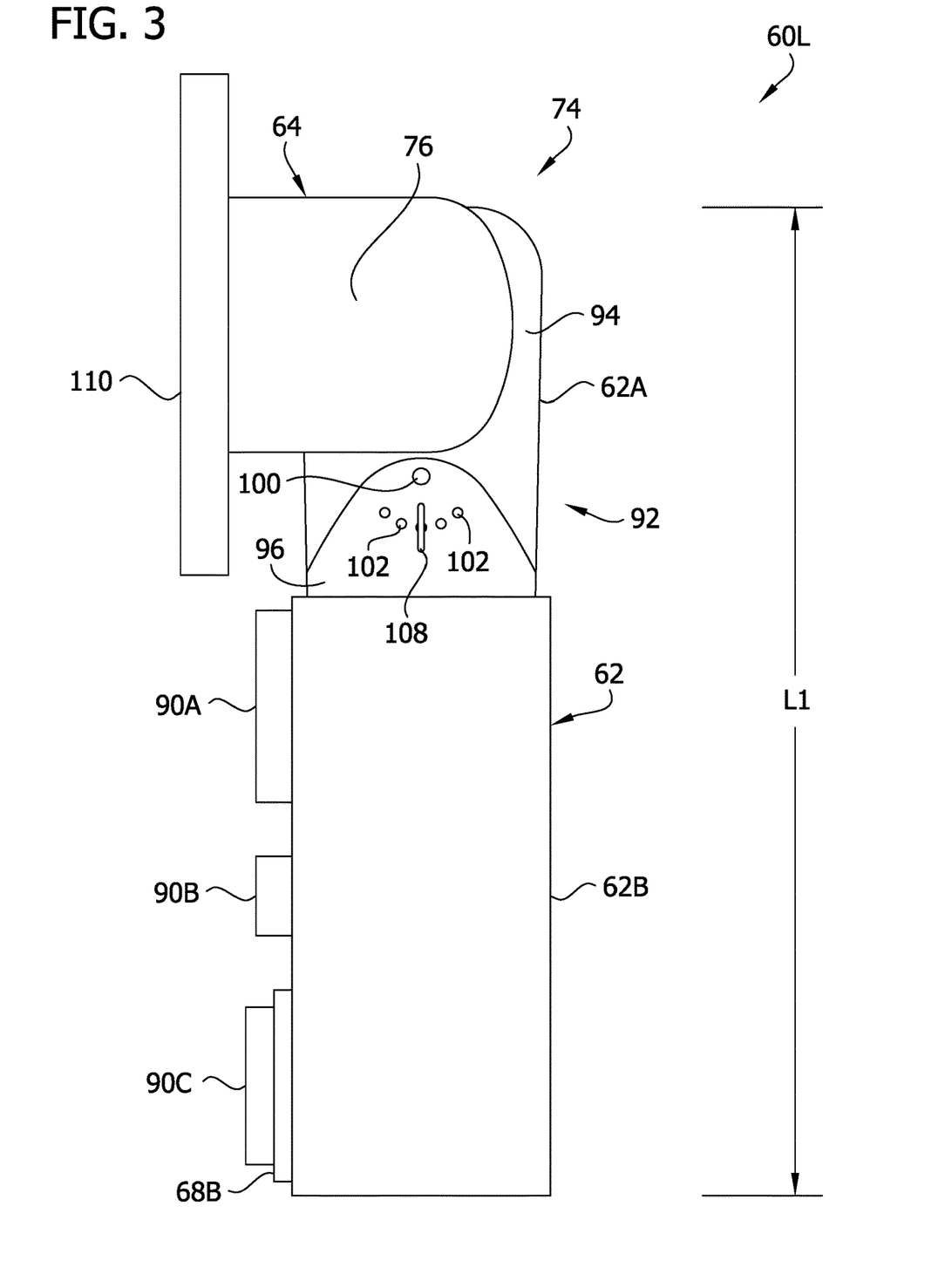
FIG. 3 is a top view of a left light assembly of the light system, an arm of the light assembly being shown in a stowed position.
Figure 4:
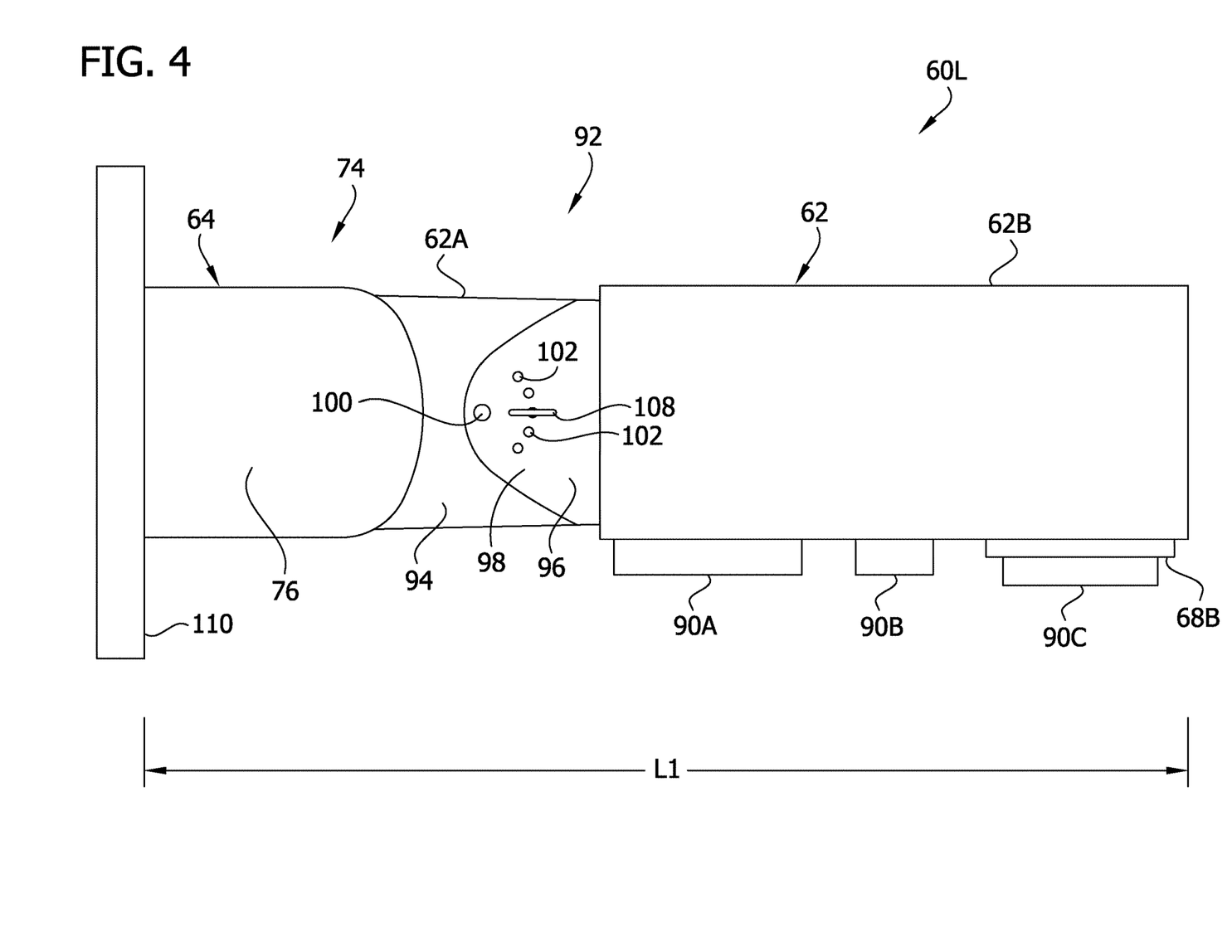
FIG. 4 is top view of the left light assembly of FIG. 3, the arm being shown in an operational position.
Figure 5:
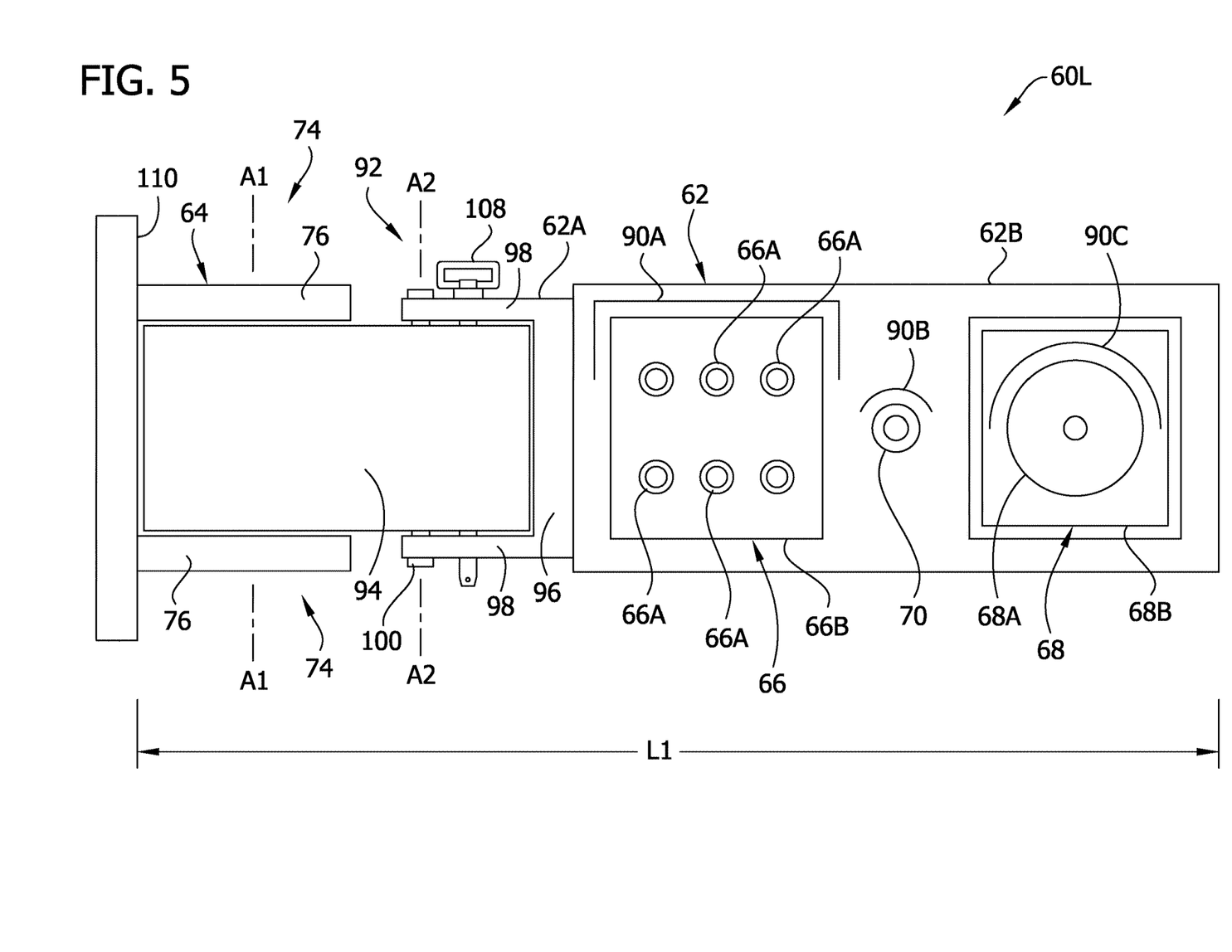
FIG. 5 is a front elevation of the light assembly of FIG. 4.

The auxiliary light system 22 of the present disclosure is configured for illuminating the area in front of the loader 40 and/or to the sides of the tractor 20 for providing the operator with better visibility than permitted by the headlights. As shown in FIG. 2, the auxiliary light system 22 includes left and right light assemblies generally indicated by 60L, 60R. The light assemblies 60L, 60R are mounted on the loader brackets 46. The light assemblies 60L, 60R are configured to be stowed when not in use and to be deployed when desired. The light assemblies 60L, 60R have a retracted, stowed configuration (e.g., FIGS. 1 and 3) and an extended, operational configuration (e.g., FIGS. 2, 6, and 7). It will be appreciated that in the retracted, stowed configuration the light assembly 60L, 60R is relatively compact and out of the way of the operator and loader 40. In the retracted, stowed configuration, the light assembly 60L, 60R is also less prone to being struck by obstacles as the tractor 20 drives by them. As explained in further detail below, in the extended, operational configuration, the light assembly 60L, 60R is configured for illuminating the area in front of the loader 40 and/or to the sides of the tractor 20.

Referring now to FIGS. 3-9, the left light assembly 60L is shown removed from the tractor 20. The left light assembly 60L will be described in further detail with the understanding the right light assembly 60R has essentially a mirror image construction except as described hereafter. The left light assembly 60L includes an arm 62 and a mount 64 for securing the arm to the loader bracket 46. The arm 62 includes a proximal section 62A secured to the mount 64 and a distal section 62B movable with respect to the proximal section. Two light sources 66, 68 and a camera 70 are provided on the distal section 62B of the arm 62. The right light assembly 60R has a similar construction but lacks a camera in the illustrated embodiment.

The arm 62 is pivotally connected to the mount 64, and the arm is configured to extend and retract for changing the configuration of the light assembly 60L between the retracted, stowed configuration and the extended, operational configuration. The arm 62 has a pivot connection 74 with the mount 64 defining a generally vertical axis of rotation A1. The arm 62 is pivotable with respect to the mount 64 about the pivot connection 74 to move the arm from a stowed position (e.g., FIGS. 1 and 3), in which the arm extends forward alongside the loader 40 and away from the operator station 32, to an operational position (e.g., FIGS. 2, 4-7) in which the arm 62 extends laterally with respect to the tractor 20 for positioning the lights 66, 68 for use. The mount 64 includes upper and lower flanges 76 between which a distal end portion of the distal section 62B of the arm 62 is received for pivotally connecting the arm to the mount. For example, a pin (not shown) may extend upward and downward from the distal end portion of the distal section 62B and be received in sockets in the upper and lower flanges 76. It will be understood that other types of pivot connections can also be used without departing from the scope of the present invention. A drive mechanism 80 (FIG. 11) can be provided for pivoting the arm 62 about the pivot connection 74. For example, the drive mechanism 80 may include an electric motor such as a type of actuator optionally with a gear drive or chain drive, etc. The drive mechanism 80 could be housed in the mount 64 and/or the arm 62.

The distal section 62B of the arm 62 is configured to extend and retract with respect to the proximal section 62A to move the distal section between a retracted position (e.g., FIGS. 1 and 3-5) and an extended position (e.g., FIGS. 2 and 6-8). In the illustrated embodiment, the distal section 62B of the arm is configured to translate with respect to the proximal section 62A by telescoping over and sliding on the proximal section. For example, the proximal and distal sections 62A, 62B can be generally hollow tubes, with the distal section defining an interior recess for receiving the proximal section. Other ways of extending and retracting the arm may be used without departing from the scope of the present invention. The distal section 62B in the extended position extends farther from the proximal section 62A and farther from the mount 64 than when the distal section is in the retracted position. A drive mechanism 82 (FIG. 11) can be provided for extending and retracting the distal section 62B. For example, the drive mechanism 82 could include an electric motor such as a type of actuator optionally with a gear drive (e.g., rack and pinion) or chain drive, etc. The drive mechanism 82 could be housed in the distal and/or proximal sections 62A, 62B of the arm 62.

Desirably, when the arm 62 is pivoted to the operational position and the distal section 62B of the arm 62 is in the extended position, at least one and desirably both of the lights 66, 68 are positioned to project light in front of the loader 40, and the camera 70 is positioned to have a range of view in front of the loader. In the retracted position of the distal section 62B, the arm 62 may have a length L1 (e.g., FIGS. 3-5) of about 14-24 inches, and in the extended position, the arm may have a length L2 (e.g., FIGS. 6, 7) of about 20-36 inches. In the illustrated embodiment, the arm 62 has a length L2 of about 26 inches when extended. Referring to FIG. 2, the length L2 of the arm 62 when extended is sufficient to position the lights 66, 68 laterally offset from or outboard of a most outboard side of the loader 40 and/or a most outboard side of the front and/or rear wheels 34A, 34B. In the illustrated embodiment, the lights 66, 68 and camera 70 are positioned laterally outboard of the most outboard sides 40' of the loader 40 (i.e., boom 42 or implement 44, whichever has the most outboard side) and the most outboard sides 34A', 34B' of the wheels 34A, 34B (i.e., front or rear wheel, whichever has the most outboard side). The arrangement is such that the light assemblies 60L, 60R can project light in front of the loader 40 in a pattern in which light from the left and right light assemblies passes the respective left and right sides of the loader and meets or overlaps in front of the loader. Accordingly, the light assemblies 60L, 60R are configured to project light in front of the tractor 20 without being significantly obstructed by the loader or an item carried by the loader.

Various types of lights can be used on the light assemblies 60L, 60R. In the illustrated embodiment, the light assemblies 60L, 60R each include a flood light 66 and a directional light 68. The flood light 66 is configured to cast a broad beam of light for general illumination in front and/or to the sides of the tractor 20. The flood light 66 in the illustrated embodiment includes a plurality of light emitting elements 66A (e.g., LEDs) in a light housing 66B. Other numbers and types (e.g., incandescent bulb) of light emitting elements can be used. The directional light 68 is configured for emitting a beam of light in a selected direction. The directional light 68 may be a spotlight configured for providing a more direct or concentrated beam of light. In the illustrated embodiment, the directional light 68 has a light housing 68B that is movably mounted on the distal section 62B of the arm 62 such that the orientation of the directional light can be changed relative to the arm to direct the beam of light in a desired direction. For example, the orientation of the directional light 68 with respect to the distal section 62B of the arm 62 can be changed by a drive mechanism 86 (FIG. 11) (e.g., including one or more electric motors such as a type of actuator) housed in or on the distal section of the arm. Desirably, the drive mechanism 86 is configured for moving the directional light 68 to orient the beam of light upward, downward, left, right, and directions therebetween, as desired. For example, the housing 68B of the directional light may be pivotally connected (e.g., by a ball joint or pan/tilt joint) to the distal section 62B of the arm 62 and movable about the pivot connection by the drive mechanism 86. In the illustrated embodiment, the directional light 68 includes a single light emitting element 68A (e.g., LED or incandescent bulb). Each of the lights 66, 68 and the camera 70 has a respective hood 90A, 90B, 90C for protection from rain, etc.

Figure 6:
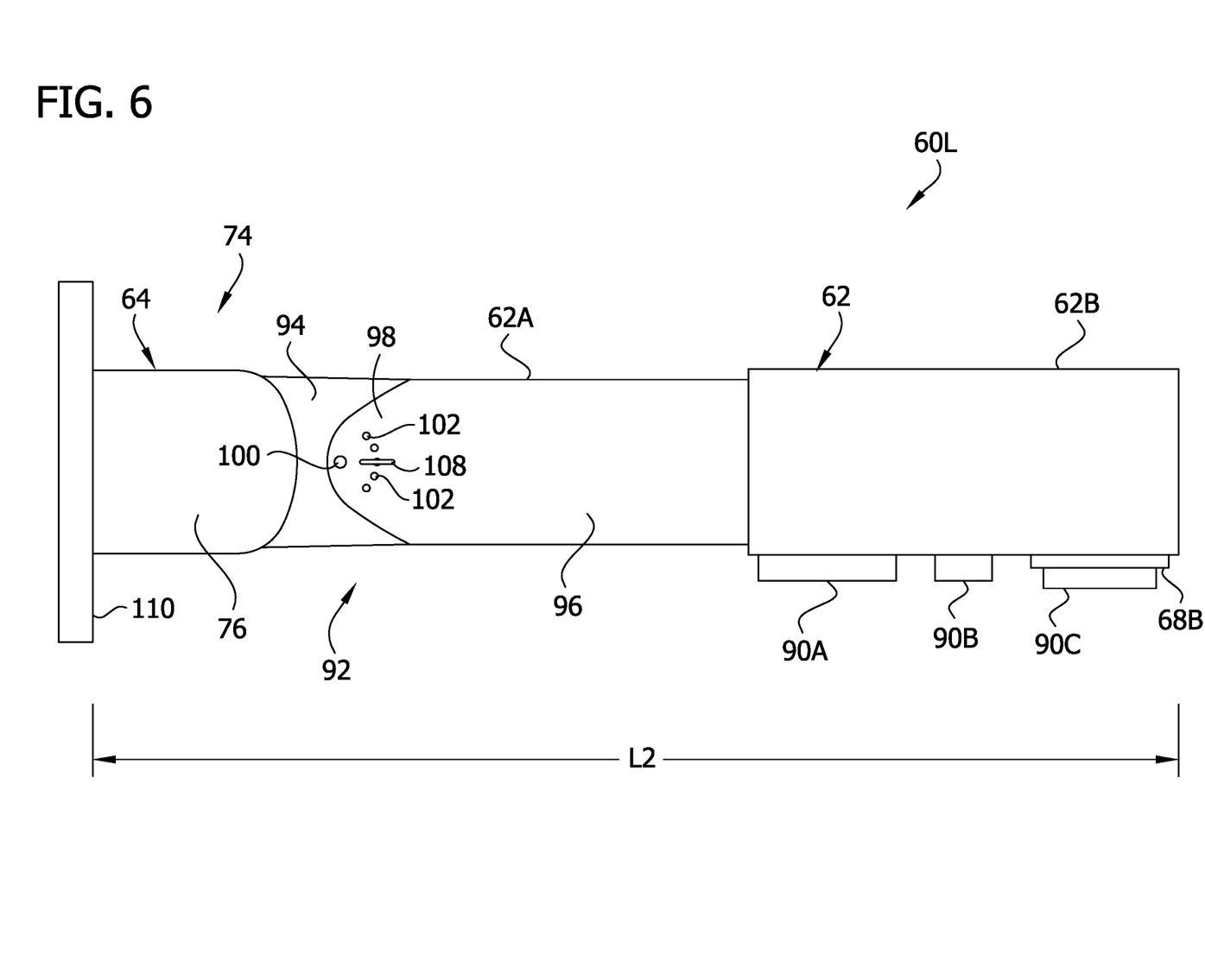
FIG. 6 is a top view of the light assembly having a distal arm section in an extended position.
Figure 7:
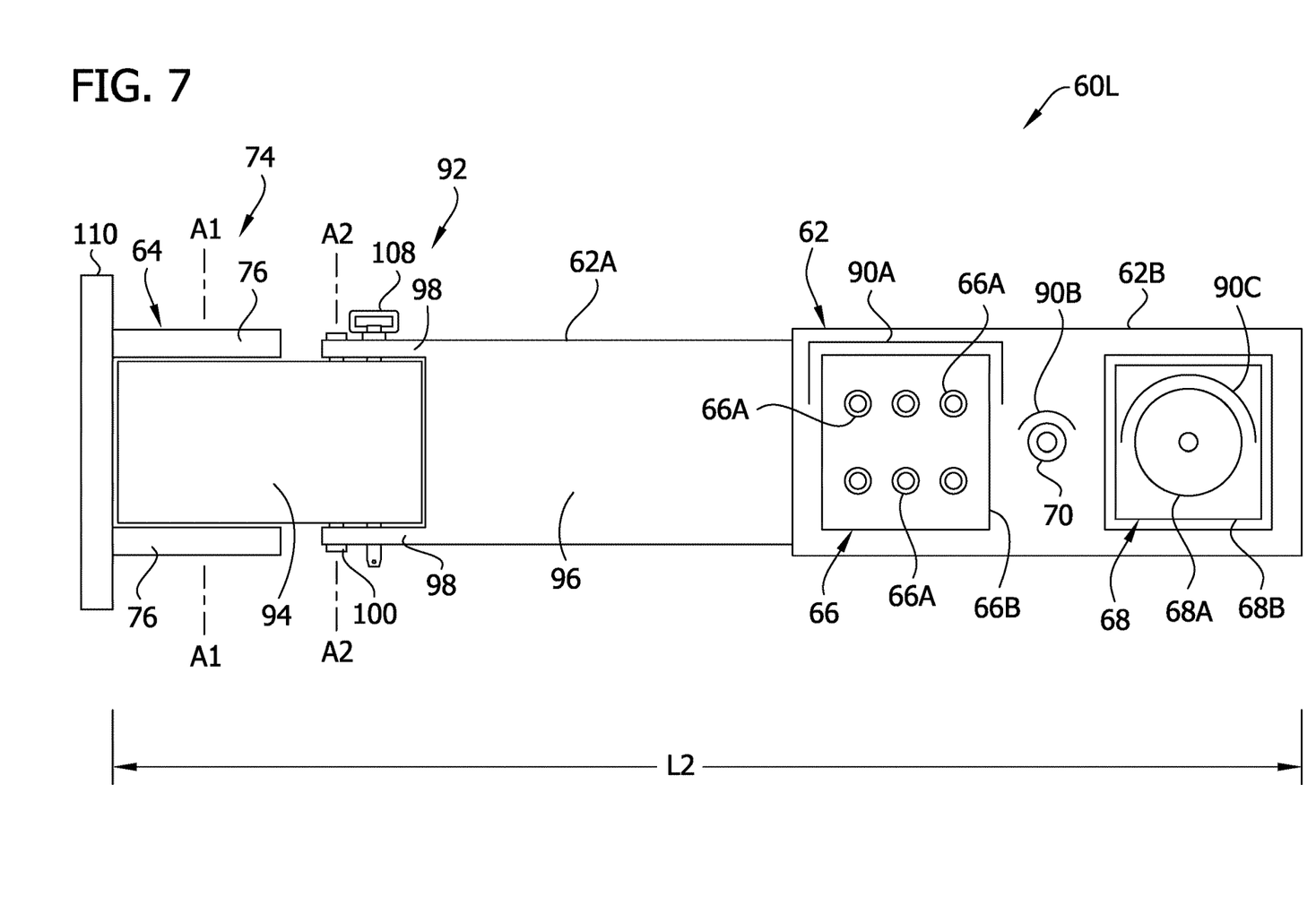
FIG. 7 is a front elevation of the light assembly of FIG. 6.
Figure 8:
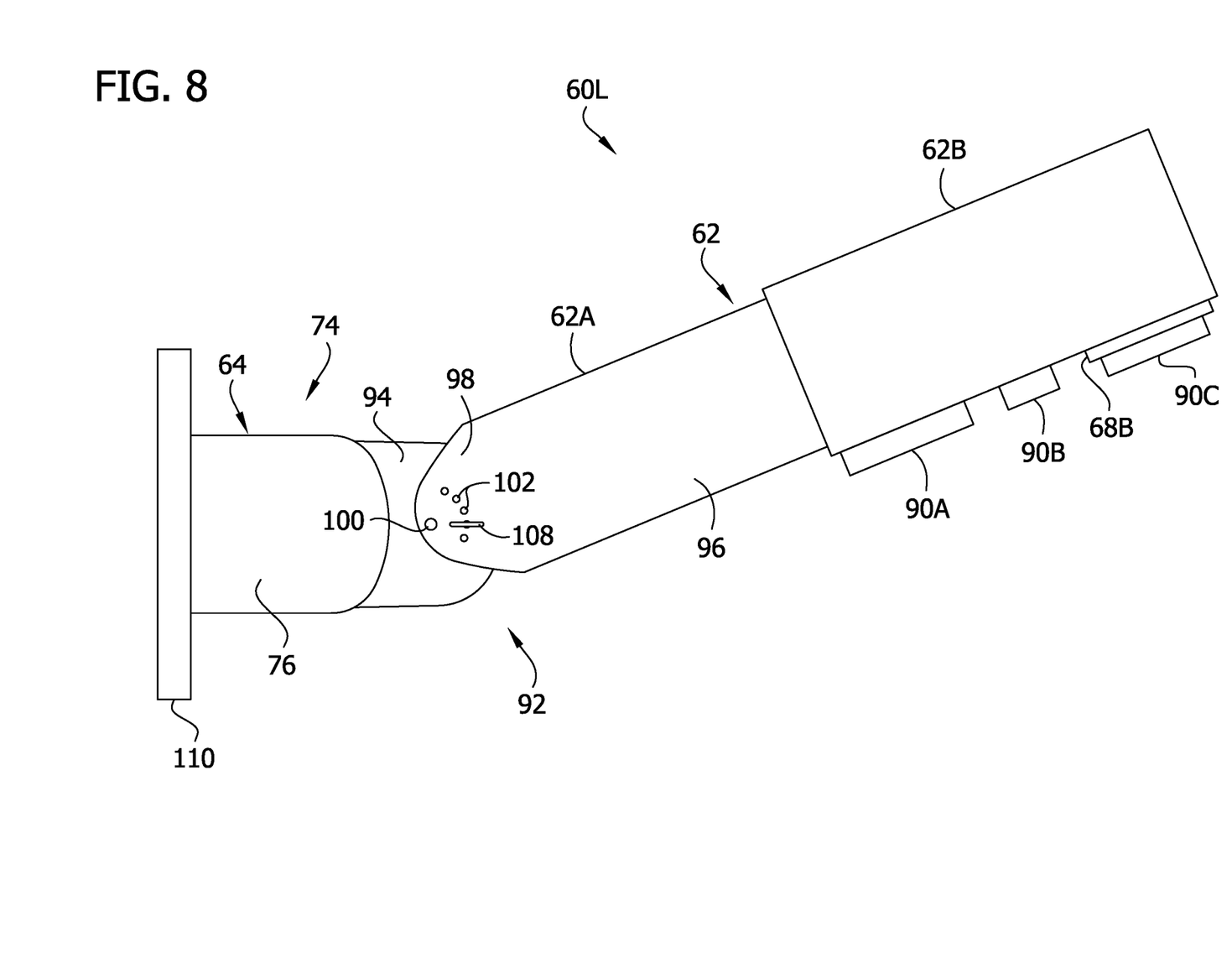
FIG. 8 is top view of the light assembly with an arm portion pivoted at a joint of the arm.

Referring to FIGS. 6 and 8, the proximal section 62A of the arm 62 has a joint 92 connecting first and second portions 94, 96 of the proximal section. In the illustrated embodiment, the joint 92 is formed by two flanges 98 extending proximally from the second portion 94 defining a yoke and in which the first portion 96 is received and pivotally connected to the second portion. As shown in FIG. 6-8, a pin 100 connects the first and second portions 94, 96 and defines a generally vertical pivot axis A2 about which the second portion is pivotable with respect to the first portion. The second portion 96 is normally locked to prevent pivoting of the second portion but can be unlocked to permit pivoting. As shown in FIG. 6, a series of openings 102 are provided in the upper and lower flanges 98 of the yoke, and corresponding upper and lower openings 102 can be aligned with an opening extending through the first portion 94 of the proximal arm section 62A. When the openings are aligned, a lock pin 108 can be received in the openings to lock the position of the second portion 96 by preventing pivoting at the joint 92. For example, the openings 102 in the yoke can be spaced at various intervals, such as intervals ranging from 5-30 degrees. In the illustrated embodiment, the openings 102 are spaced at 20 degree intervals such that the second portion 96 can be pivoted forward and locked at 20 or 40 degrees or pivoted rearward and locked at 20 or 40 degrees, with respect to a home position (e.g., FIG. 6), or out of alignment with the first portion 94. The lock pin 108 can be a hitch pin having a handle and a keeper, which is illustrated as a ball detent, but could be a cotter pin or lynch pin, etc. As will be appreciated, the pivot connection at the joint 92 permits the user to manually adjust the angle of the arm 62 to orient the lights 66, 68 of the light assemblies 60L, 60R in selected directions. For example, the user may desire to face the lights 66, 68 more laterally, such as shown in FIG. 8. Other numbers of pivoted, locked positions, and other degrees of pivot, could be provided without departing from the scope of the present invention. Moreover, the lock pin 108 could serve as a shear pin or a weakest link and desired point of failure along the arm 62 if, for example, the arm encounters an obstacle while the tractor is moving. In such case, the lock pin 108 would break and permit the arm to pivot rearward to avoid substantial damage to other components of the light assembly.

Figure 9:
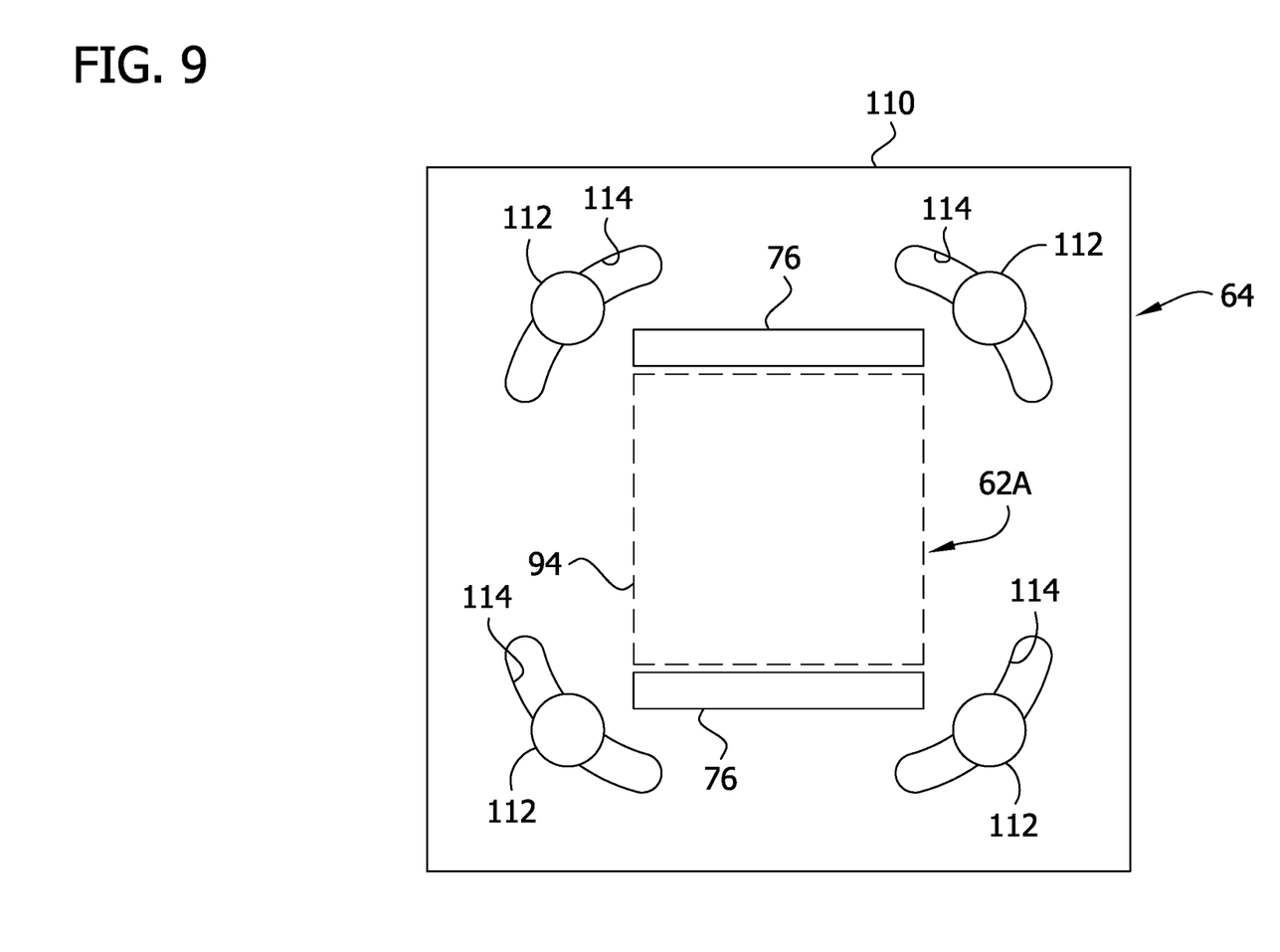
FIG. 9 is an elevation of a mounting plate of a mount of the light assembly for mounting the light assembly to the tractor.

The mount 64 can be configured to mount to the loader bracket 46 in any suitable manner. For example, as shown in FIG. 9, the mount 64 includes a plate 110 configured for receiving bolts 112 or other fasteners to secure the mount to the loader bracket 46. As shown in FIG. 9, the plate 110 may include a plurality of slots 114 (arcuate slots in the illustrated embodiment) through which carriage bolts 112 may extend for fastening the plate to the loader bracket 46. The slots 114 permit placement of the bolts 112 at various positions in the slots to provide versatility in mounting the mount to various types of tractors, based on the mounting structure provided by the loader bracket 46. In assembly, the bolts 112 are inserted through the slots 114 and openings in the loader bracket 46, and nuts are threaded onto and tightened on the bolts to secure the mount to the loader bracket. It will be understood that the mount 64 can be fastened to other parts of a tractor or to other types of vehicles without departing from the scope of the present invention. Moreover, the mount can be secured in other ways, such as by welding, adhering, or using other types of mechanical fasteners.

Figure 10:
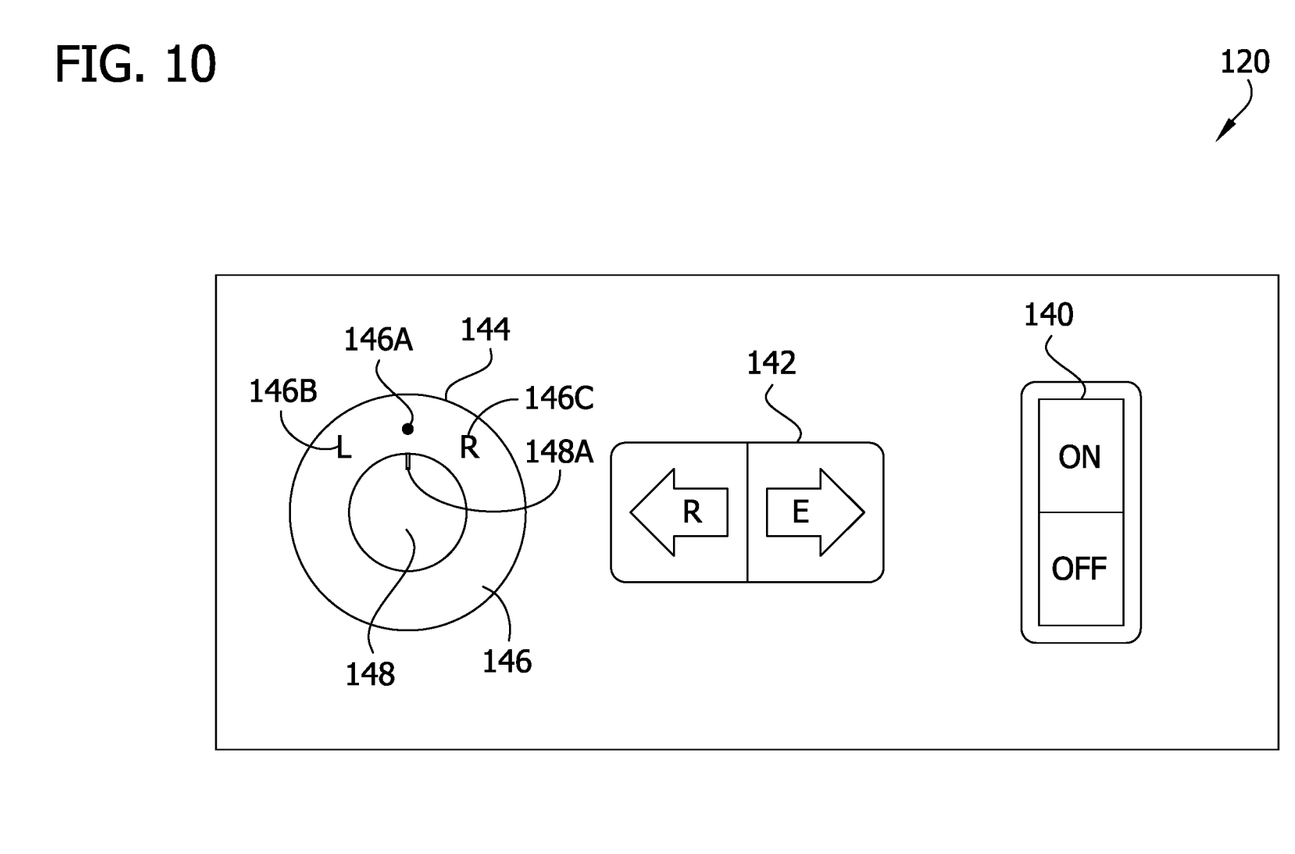
FIG. 10 is a user interface for the light system.
Figure 11:
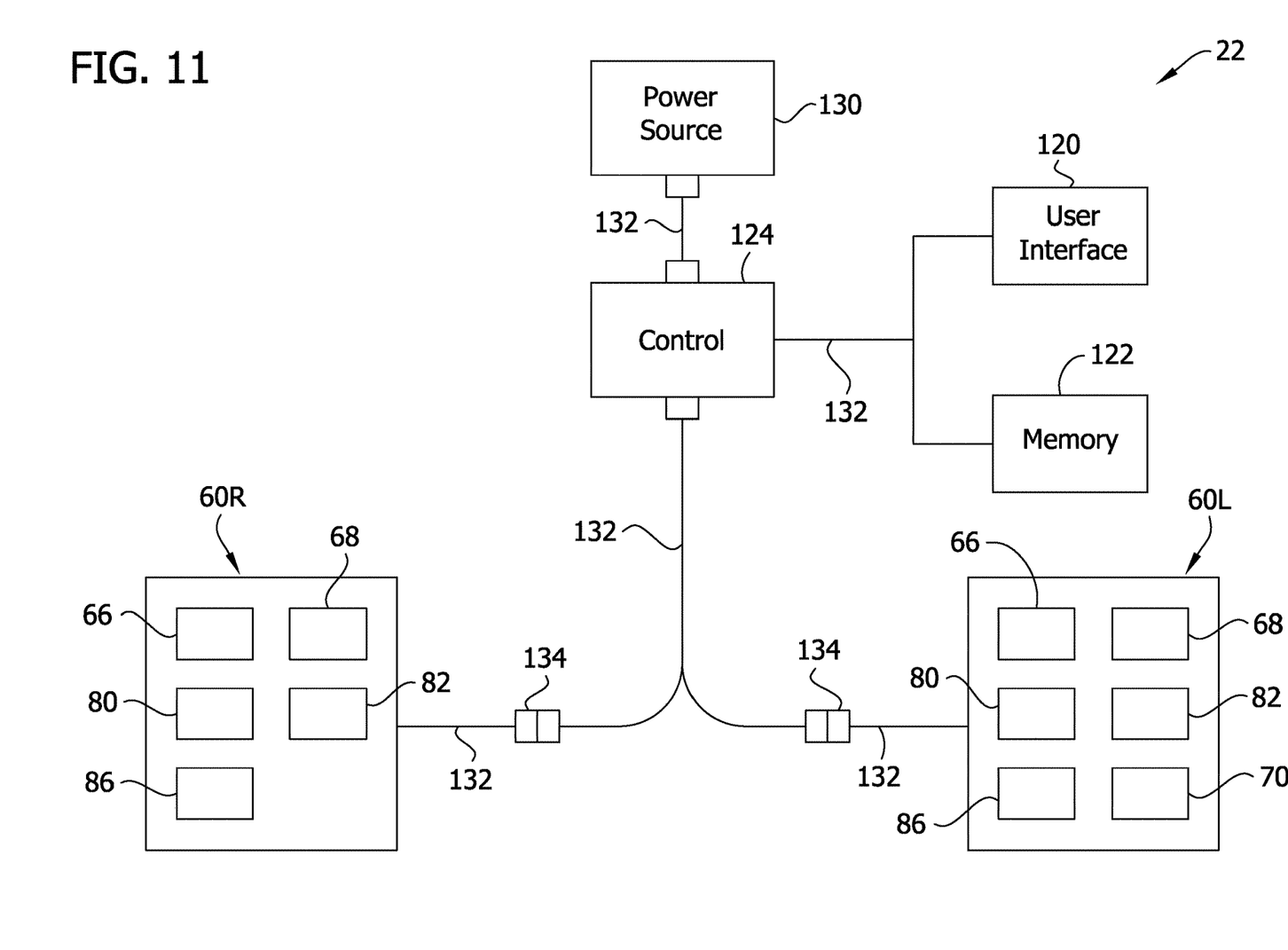
FIG. 11 is a schematic of the light system including control components for the light assemblies.

FIG. 11 shows a schematic of the light system 22 as may be implemented on the tractor 20. The system 22 includes the left and right light assemblies 60L, 60R, a user interface 120, a tangible storage medium 122 (memory), and a control or microprocessor 124. An exemplary user interface 120 is shown in FIG. 10 and will be discussed below. The system 22 is connected to a power source 130, which can be a battery of the tractor 20. The components of the light system 22 are operatively connected by suitable interconnections electronics 132, which can include electrical or fiber optic lines and/or wireless communication devices. The microprocessor 124 is adapted for reading and executing instructions stored in the storage medium 122, and is responsive to user input at the user interface 120 for controlling the various components of the light assemblies 60L, 60R. The user interface 120 provides command signals via the interconnection electronics 132 to the microprocessor 124. The microprocessor 124 responds to the command signals and provides control signals corresponding thereto via the interconnection electronics 132 to the various components of the light assemblies 60L, 60R. In the illustrated embodiment, the left and right light assemblies 60L, 60R include respective groups of wires and/or cables terminating in a connector 134 for operatively connecting the light assemblies with the microprocessor 124, user interface 120, and memory 122, which may be provided together as a unit.

Referring to FIG. 10, the user interface 120, which can be provided at the operator station 32 of the tractor 20, can include several switches for controlling operation of the light system 22. In the illustrated embodiment, first, second, and third switches 140, 142, 144 are provided. The first switch 140 is a power switch than can be used for powering the lights on/off. The second and third switches 142, 144 can be used to control movement of the light assemblies 60L, 60R and directional lights 68. The third switch 144 is a combination rotary and joystick switch. The third switch 144 includes a dial 146 and a knob 148. The knob 148 has a selection indicator 148A and the dial has a home position indicator 146A and "L" and "R" indicators 146B, 146C. When the knob 148 is rotated to align the selection indicator 148A with the home position indicator 146A of the dial 146 (as shown in FIG. 10), pivoting movement of the knob 148 to the left as a joystick causes the drive mechanisms 80 to pivot the arms 62 from the stowed positions to the operational positions. The arms 62 can be pivoted to and stopped at an infinite number of pivoted positions. The arms 62 can be pivoted back to the stowed position by moving the knob 148 to the right as a joystick. When the arms 62 are pivoted to the operational position, the distal sections 62B can be extended by using the second switch 142. Pressing the "E" button of the second switch 142 causes the drive mechanisms 82 to extend the distal arm sections 62B until maximum extension is achieved or the "E" button is released. The distal arm sections 62B can be extended to an infinite number of extended positions between the retracted and the fully extended position. The distal arm sections 62B can be retracted by pressing the "R" button of the second switch 142. To control orientation of the directional lights 68, the user can rotate the knob 148 of the third switch 144 such that the knob selection indicator 148A is aligned with the "L" or "R" indicator 146B, 146C on the dial 146, corresponding to the directional light 68 on the left or right light assembly 60L, 60R. In this rotated position of the knob 148, the knob can be used as a joystick to control the associated drive mechanism 86 to change the orientation of the respective directional light to aim the light beam in a selected direction (e.g., up, down, left, right, etc.). Accordingly, the directional lights 68 are separately controllable and can be oriented in various different directions with respect to one another and the arms 62. Other user interfaces can be used without departing from the scope of the present invention.

The camera 70 can be used to record video and/or photographs to the storage medium 122. Moreover, the user interface 120 may include a display (e.g., LCD display) for displaying real-time video from the camera 70.

Components of the auxiliary light system 22 can be made of metal, plastic, and/or any other suitable material.

It will be appreciated that the light system 22 of the present disclosure, although disclosed with respect to a utility tractor 20, can be used on tractors of other types and on other types of vehicles without departing from the scope of the present invention. Moreover, the light system 22 can be original equipment to the vehicles or sold separately for addition to the vehicles. The light system, components thereof, and associated methods are believed to be inventive themselves and not necessarily only in conjunction with a tractor or other vehicle.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A tractor comprising:
a main body,
a loader supported by the main body,
at least one loader bracket connecting the loader to the main body, and
a light system comprising at least one light assembly secured to the loader bracket, the light assembly including an arm and at least one light, the arm having a proximal section connected to the loader bracket and a distal section supported by the proximal section, the light being secured to the distal section, the distal section having retracted and extended positions with respect to the proximal section, the distal section being movable with respect to the proximal section for moving the distal section between the retracted and extended positions, the distal section in the extended position extending farther away from the proximal section than when the distal section is in the retracted position;
wherein the distal and proximal sections are configured to telescope for moving the distal section from the extended position to the retracted position;
wherein the distal section is configured to receive the proximal section in the distal section when the distal section is retracted over the proximal section from the extended position to the retracted position.

2. A tractor as set forth in claim 1, wherein when the distal section is in the extended position the at least one light is at least partially laterally outboard of a most laterally outboard side of the loader.

3. A tractor as set forth in claim 1, wherein the tractor includes a rear wheel connected to the main body and rotatable for moving the tractor, and when the distal section is in the extended position the at least one light is at least partially laterally outboard of a most laterally outboard side of the wheel.

4. A tractor as set forth in claim 1, wherein the distal section is configured to translate with respect to the proximal section.

5. A tractor as set forth in claim 1, wherein the light assembly further comprises a drive mechanism configured for moving the distal section between the retracted and extended positions.

6. A tractor as set forth in claim 5, wherein the tractor includes an operator station, and the light system includes a user interface at the operator station configured for controlling the drive mechanism to move the distal section between the retracted and extended positions.

7. A tractor as set forth in claim 1, wherein the light assembly includes a mount secured to the loader bracket for mounting the light assembly on the loader bracket, the proximal section of the arm being pivotally connected to the mount, the arm being pivotable with respect to the mount about the pivot connection between a stowed position and an operational position.

8. A tractor as set forth in claim 7, wherein the light assembly further comprises a drive mechanism configured for pivoting the arm between the stowed and operational positions.

9. A tractor as set forth in claim 8, wherein the tractor includes an operator station, and the light system includes a user interface at the operator station configured for controlling the drive mechanism to move the distal section between the stowed and operational positions.

10. A tractor as set forth in claim 7, wherein the arm includes a second pivot connection, the second pivot connection having a generally upstanding pivot axis and permitting the light to be pivoted with respect to the mount for directing light from the light laterally away from the main body of the tractor.

11. A tractor as set forth in claim 1, wherein the at least one light comprises a directional light, the directional light being movably mounted to the arm to permit movement of the directional light to selected orientations for directing light produced by the directional light in a desired direction.

12. A tractor as set forth in claim 11, further comprising a drive mechanism configured for moving the directional light with respect to the arm to change the orientation of the directional light.

13. A tractor as set forth in claim 12, wherein the tractor includes an operator station, and the light system includes a user interface at the operator station configured for controlling the drive mechanism to move the directional light with respect to the arm to change the orientation of the directional light.

14. A tractor as set forth in claim 1, wherein the light assembly comprises a camera on the arm.

15. A tractor comprising:
a main body,
a loader supported by the main body,
at least one loader bracket connecting the loader to main body, and
a light system comprising at least one light assembly secured to the loader bracket, the light assembly including an arm and at least one light on the arm,
wherein the at least one light comprises a directional light, the directional light being movably mounted on the arm to permit movement of the directional light to selected orientations for directing light produced by the directional light in a desired direction;
wherein the light assembly includes a mount secured to the loader bracket for mounting the light assembly on the loader bracket, the arm being pivotally connected to the mount, the arm being pivotable about a pivot axis with respect to the mount about the pivot connection between a stowed position and an operational position;
wherein at least one of the mount or the arm includes a plurality of openings, and the light assembly further comprises a pin, the arm being pivotable with respect to the mount to locate a selected one of the plurality of openings for reception of the pin in said one of the plurality of openings to retain the arm in pivoted position with respect to the mount, the pin when in said one of the plurality of openings being offset from the pivot axis.

16. A tractor as set forth in claim 15, wherein the light system further comprises a drive mechanism configured for moving the directional light with respect to the arm to change the orientation of the directional light.

17. A tractor as set forth in claim 16, further comprising an operator station, wherein the light system includes a user interface at the operator station configured for controlling the drive mechanism to move the directional light with respect to the arm to change the orientation of the directional light.

18. A tractor comprising:
a main body,
a loader supported by the main body,
at least one loader bracket connecting the loader to the main body, and
a light system comprising at least one light assembly secured to the loader bracket, the light assembly including a mount, an arm, and at least one light, the mount securing the light assembly to the loader bracket, the arm being supported by the mount, the light being secured to the arm, the light assembly being configurable in a stowed configuration and in an operational configuration different than the stowed configuration, the arm extending farther away from the main body in the operational configuration than in the stowed configuration, the light in the operational configuration being at least partially laterally outboard of a most laterally outboard side of the loader for illuminating an area in front of the loader;
wherein the arm is pivotally connected to the mount, the arm being pivotable about a pivot axis with respect to the mount about the pivot connection between the stowed configuration and the operational configuration, and wherein at least one of the mount or the arm includes a plurality of openings, and the light assembly further comprises a pin, the arm being pivotable with respect to the mount to locate a selected one of the plurality of openings for reception of the pin in said one of the plurality of openings to retain the arm in pivoted position with respect to the mount, the pin when in said one of the plurality of openings being offset from the pivot axis.

19. A tractor comprising:
a main body,
a loader supported by the main body,
at least one loader bracket connecting the loader to the main body, and
a light system comprising at least one light assembly secured to the loader bracket, the light assembly including an arm and at least one light, the arm having a proximal section connected to the loader bracket and a distal section supported by the proximal section, the light being secured to the distal section, the distal section having retracted and extended positions with respect to the proximal section, the distal section being movable with respect to the proximal section for moving the distal section between the retracted and extended positions, the distal section in the extended position extending farther away from the proximal section than when the distal section is in the retracted position;
wherein the light assembly includes a mount secured to the loader bracket for mounting the light assembly on the loader bracket, the proximal section of the arm being pivotally connected to the mount, the arm being pivotable with respect to the mount about the pivot connection between a stowed position and an operational position;
wherein at least one of the mount or the proximal section includes a plurality of openings, and the light assembly further comprises a pin, the proximal section being pivotable with respect to the mount to locate a selected one of the plurality of openings for reception of the pin in said one of the plurality of openings to retain the proximal section in pivoted position with respect to the mount, the pin when in said one of the plurality of openings being offset from a pivot axis of the proximal portion with respect to the mount.

* * * * *